(12) United States Patent
Horikawa

(10) Patent No.: US 7,577,159 B2
(45) Date of Patent: Aug. 18, 2009

(54) METHOD, DEVICE, SYSTEM AND PROGRAM FOR TIME-SERIES DATA MANAGEMENT

(75) Inventor: Takashi Horikawa, Tokyo (JP)

(73) Assignee: NEC Corporation (JP)

( * ) Notice: Subject to any disclaimer, the term of this patent is extended or adjusted under 35 U.S.C. 154(b) by 541 days.

(21) Appl. No.: 11/220,639

(22) Filed: Sep. 8, 2005

(65) Prior Publication Data

US 2006/0056436 A1 Mar. 16, 2006

(30) Foreign Application Priority Data

Sep. 10, 2004 (JP) ............................. 2004-264589

(51) Int. Cl.
*H04L 12/28* (2006.01)
(52) U.S. Cl. ...................................... 370/412; 370/413
(58) Field of Classification Search ...................... None
See application file for complete search history.

(56) References Cited

U.S. PATENT DOCUMENTS

| | | | | |
|---|---|---|---|---|
| 6,021,132 | A * | 2/2000 | Muller et al. | 370/412 |
| 6,349,097 | B1 * | 2/2002 | Smith | 370/390 |
| 6,804,228 | B1 * | 10/2004 | Schaefer | 370/382 |
| 7,113,516 | B1 * | 9/2006 | Shefi et al. | 370/412 |
| 7,295,565 | B2 * | 11/2007 | Hendel | 370/413 |
| 7,457,282 | B2 * | 11/2008 | Mallila | 370/352 |
| 2002/0156764 | A1 * | 10/2002 | Goudie et al. | 707/1 |
| 2003/0177293 | A1 * | 9/2003 | Bilak et al. | 710/56 |

FOREIGN PATENT DOCUMENTS

| | | |
|---|---|---|
| JP | 2-035550 A | 2/1990 |
| JP | 5-022379 A | 1/1993 |
| JP | 5-197597 A | 8/1993 |
| JP | H06-266855 | 9/1994 |
| JP | 10-097435 A | 4/1998 |
| JP | H11-073367 | 3/1999 |
| JP | 2001-184191 A | 7/2001 |
| JP | 3365372 | 11/2002 |

* cited by examiner

*Primary Examiner*—Phirin Sam
(74) *Attorney, Agent, or Firm*—Dickstein, Shapiro, LLP.

(57) ABSTRACT

A time-series data management method, a time-series data management device, a time-series data management system, and a time-series data management program capable of eliminating overhead due to exclusive access control and improving the efficient use of a buffer as well as enabling the start position of the oldest or nearly oldest data to be specified easily. A buffer for storing time-series data from a plurality of time-series data generators is divided into a plurality of buffer elements to manage time-series data. The buffer elements are dynamically allocated to the respective time-series data generators.

12 Claims, 6 Drawing Sheets

METHOD, DEVICE, SYSTEM AND PROGRAM FOR TIME-SERIES DATA MANAGEMENT

FIELD OF THE INVENTION

The present invention relates to a time-series data management method, a time-series data management device, a time-series data management system, and a time-series data management program.

BACKGROUND OF THE INVENTION

One known technique to store and manage the latest data involves the use of a ring buffer. The ring buffer in general has a problem in that, when data buffered therein each have a different or variable length, the start position of the oldest or nearly oldest data cannot be specified.

In the case of variable-length data, the start position of each data depends on the previous data and therefore is unfixed, which makes it difficult to specify the start position of the oldest data or the like. In order to solve the problem, the ring buffer may retain information indicating the start position of the oldest data and update the information each time existing data are overwritten. This, however, causes an increase in the amount of processing to write data.

With the ring buffer, another problem arises if there exists a plurality of time-series data generators.

Two types of approaches have been made to the problem of a plurality of time-series data generators to apply the ring buffer technique.

The first approach is to share one ring buffer among a plurality of data generators. In this case, before a data generator writes data to the ring buffer, the generator is required to perform exclusive access control concerning the use of the buffer with the other data generators.

The exclusive access control introduces overhead to each data write operation, thus causing an increase in the amount of processing to write data to the buffer. In other words, the write performance of the buffer is deteriorated.

The second approach is to allocate a ring buffer to each data generator. In this case, exclusive access control is not necessary differently from the first approach. However, the buffer cannot be efficiently utilized. More specifically, if the amounts of data produced per unit of time by respective data generators are considerably different, the time length during which time-series data stored in the buffer is valid is determined by the period until the buffer of a generator which produces data most frequently becomes full. Accordingly, the buffer of a generator which produces data less frequently is not efficiently utilized.

It is assumed that ring buffers (buffers 1 and 2) each having a capacity of 1 are allocated to generators 1 and 2, respectively, and the generator 1 produces data in an amount of 1 per unit of time, while the generator 2 produces data in an amount of 0.1. In this case, the buffers 1 and 2 can store time-series data having time lengths of 1 and 10, respectively. However, considering the buffers (both the buffers 1 and 2) as a whole, the time length of time-series data capable of being buffered is set to the shortest one of the time lengths of data stored in the respective buffers. That is, the time length of time-series data is set to 1 corresponding to the buffer 1. Otherwise, data produced during a certain period of time may no longer exist in the buffer 1, and therefore, it becomes impossible to satisfy the condition that "data produced by respective generators should be read out from buffers in order of data creation time". Consequently, the area in the buffer 2 for storing data produced during a period from (current time −10) to (current time −1) is not efficiently utilized. Generally, the frequency of data creation by each generator cannot be estimated and also may vary according to circumstances. It is, therefore, impossible to allocate each generator a buffer having a capacity most suitable for the generator in advance. Thus, allocation cannot be performed successfully in terms of efficiency as well as buffer capacity. That is, the second approach has a problem in that data produced by respective generators cannot be read out from buffers in order of data creation time (time series order).

In Japanese Patent Application laid open No. HEI6-266855, there is described a time-series data file system, and FIG. 3 thereof shows an example of the constructions of a file area and file management information. In the file area, the data record and free record lengths are fixed.

In the time-series data file system, however, when one buffer is written by a plurality of data generators, adjustment or access control is required with respect to the use of the buffer among the data generators.

In Japanese Patent Application laid open No. HEI11-73367, there is described a storage control device, and FIG. 1 thereof shows the first and second pointers in a management information storage. The first pointer specifies the start address of an area in a data storage in which subsequent data is to be stored. The second pointer specifies the start address of an area in the data storage in which the oldest valid data are stored. These pointers differ from those of the present invention.

In Japanese Patent No. 3365372, there is disclosed an event log information storing system. In the event log information storing system, a ring buffer is formed for a plurality of data generators, and if there is no available buffer, one of used buffers is selected according to an algorithm for reuse.

In the conventional techniques for managing time-series data, when a plurality of time-series data generators exists, there are problems of overhead due to exclusive access control and efficient use of a buffer.

Further, in the case of variable-length data, it is difficult to specify the start position of the oldest data or the like.

SUMMARY OF THE INVENTION

It is therefore an object of the present invention to provide a time-series data management method, a time-series data management device, a time-series data management system, and a time-series data management program capable of eliminating overhead due to exclusive access control and improving the efficient use of a buffer as well as enabling the start position of the oldest or nearly oldest data to be specified easily.

In accordance with the first aspect of the present invention, to achieve the object mentioned above, there is provided a time-series data management method in which a buffer for storing time-series data from a plurality of time-series data generators is divided into a plurality of buffer elements, the method comprising the steps of dynamically allocating a buffer element to each time-series data generator, checking whether or not the buffer element has free space or area, and when the buffer element has no free space or the free space is insufficient, reusing a buffer element storing the oldest data for allocation.

In accordance with the second aspect of the present invention, the time-series data management method of the first aspect further comprises as a preparation for buffering data from the time-series data generators the steps of adding buffer elements to generator lists corresponding to the time-series data generators, respectively, and adding other buffer elements to a general list.

In accordance with the third aspect of the present invention, in the time-series data management method of the first or second aspect, the step of buffer element allocation includes the steps of writing data received from a time-series data generator and a value indicating the current time obtained by referring to a clock as time information to the data storage area of the buffer element indicated by data write position information, and adding a value indicating the size of the data storage area occupied by the data and the time information written thereto to the value retained as the data write position information.

In accordance with the fourth aspect of the present invention, there is provided a time-series data management method comprising the steps of performing initialization as a preparation for buffering data from time-series data generators by adding buffer elements to generator lists corresponding to the time-series data generators, respectively, and adding other buffer elements to a general list, receiving a data write request from a time-series data generator, checking whether or not a buffer element to be written has sufficient data storage area before the data is written to the buffer element, when the buffer element does not have sufficient data storage area, checking whether or not there is an unused buffer element, and when there is no unused buffer element, reusing a buffer element storing the oldest data for allocation.

In accordance with the fifth aspect of the present invention, in the time-series data management method of the fourth aspect, the step of initialization includes the step of setting an order counter to a predetermined default value.

In accordance with the sixth aspect of the present invention, in the time-series data management method of the fifth aspect, when a time-series data generator produces data to be buffered, the time-series data generator provides the data, its generator number or identification number, and a value indicating the current time obtained by referring to a built-in clock as time information.

In accordance with the seventh aspect of the present invention, the time-series data management method of the fifth or sixth aspect further comprises the steps of defining a buffer element indicated by a list end pointer as a buffer element to be written, referring to data write position information and checking the size of the available data storage area of the buffer element to determine whether or not the buffer element has sufficient free space for the data to be written, and when the buffer element has sufficient free space available for the data, writing the data to the buffer element.

In accordance with the eighth aspect of the present invention, the time-series data management method of one of the fifth to seventh aspects further comprises, to write the data to the buffer element, the steps of obtaining a current order value from the order counter, setting the order counter to a value obtained by adding 1 to the current order value, writing the data received from the time-series data generator, the time information and the current order value obtained by referring to the order counter to the data storage area indicated by data write position information, and updating the data write position information.

In accordance with the ninth aspect of the present invention, there is provided a time-series data management method in which a plurality of buffer elements are dynamically managed to be shared among a plurality of buffer users, the method comprising the steps of retaining the order of allocation of the respective buffer elements to the respective buffer users, receiving a buffer element allocation request from a first buffer user, when there is no unused buffer element, detecting a buffer element which was least recently allocated to a second buffer user based on the order of allocation, freeing the buffer element allocated to the second buffer user, and allocating the freed buffer element to the first buffer user.

In accordance with the tenth aspect of the present invention, there is provided a time-series data management device comprising a management section, a plurality of buffer elements, a plurality of time-series data generators, and a clock. The management section dynamically allocates a buffer element to data produced by each time-series data generator. When the buffer element has no free space or the free space is insufficient, the management section reuses a buffer element storing the oldest data so that the buffer as a whole can always store the latest data. The management section writes data to the buffer element so that the beginning of the data is positioned at the top of the buffer element. The buffer elements store data produced by the time-series data generators according to instructions from the management section. The time-series data generators produce data in a time series.

In accordance with the eleventh aspect of the present invention, the time-series data management device of the tenth aspect further comprises an order counter, the clock is built in each of the time-series data generator, and the order counter is set to a predetermined default value.

In accordance with the twelfth aspect of the present invention, there is provided a time-series data management system comprising a management section, a plurality of buffer elements, a plurality of time-series data generators, and a clock. The management section is a computer, the time-series data generator is another computer, and the buffer element is a storage inside or independent of the management section controlled by the management section. The management section dynamically allocates a buffer element to data produced by each time-series data generator. When the buffer element has no free space or the free space is insufficient, the management section reuses a buffer element storing the oldest data so that the buffer as a whole can always store the latest data. The management section writes data to the buffer element so that the beginning of the data is positioned at the top of the buffer element. The buffer elements store data produced by the time-series data generators according to instructions from the management section. The time-series data generators produce data in a time series.

In accordance with the thirteenth aspect of the present invention, the time-series data management system of the twelfth aspect further comprises an order counter, the clock is built in each of the time-series data generator, and the order counter is set to a predetermined default value.

In accordance with the fourteenth aspect of the present invention, in the time-series data management system of the twelfth or thirteenth aspect, the management section includes an initialization section, an allocation section, a writing section, and a management data storage. Each of the buffer elements is provided with list pointers and managed by a plurality of lists with pointers in the management data storage. The initialization section performs initialization for buffering data from the time-series data generators. The writing section receives a data write request from a time-series data generator and writes the data to a buffer element. The allocation section receives a buffer element allocation request from the writing section. When there is an unused buffer element, the allocation section allocates the unused buffer element for the data. When there is no unused buffer element, the allocation section allocates a buffer element storing the oldest data (data produced least recently) for the data.

In accordance with the fifteenth aspect of the present invention, there is provided a time-series data management program for causing a computer to perform a time-series data management method in which a buffer to store time-series data from a plurality of time-series data generators is divided into a plurality of buffer elements, the program comprising the steps of dynamically allocating a buffer element to each time-series data generator, checking whether or not the buffer element has free space, and when the buffer element has no free space or the free space is insufficient, reusing a buffer element storing the oldest data for allocation.

In accordance with the sixteenth aspect of the present invention, the time-series data management program of the fifteenth aspect further comprises as a preparation for buffering data from the time-series data generators the steps of adding buffer elements to generator lists corresponding to the time-series data generators, respectively, and adding other buffer elements to a general list.

In accordance with the seventeenth aspect of the present invention, in the time-series data management method of the fifteenth or sixteenth aspect, the step of buffer element allocation includes the steps of writing data received from a time-series data generator and a value indicating the current time obtained by referring to a clock as time information to the data storage area of the buffer element indicated by data write position information, and adding a value indicating the size of the data storage area occupied by the data and the time information written thereto to the value retained as the data write position information.

In accordance with the eighteenth aspect of the present invention, there is provided a time-series data management program for causing a computer to perform a time-series data management method comprising the steps of performing initialization as a preparation for buffering data from time-series data generators by adding buffer elements to generator lists corresponding to the time-series data generators, respectively, and adding other buffer elements to a general list, receiving a data write request from a time-series data generator, checking whether or not a buffer element to be written has sufficient data storage area before the data is written to the buffer element, when the buffer element does not have sufficient data storage area, checking whether or not there is an unused buffer element, and when there is no unused buffer element, reusing a buffer element storing the oldest data for allocation.

In accordance with the nineteenth aspect of the present invention, in the time-series data management program of the eighteenth aspect, the step of initialization includes the step of setting an order counter to a predetermined default value.

In accordance with the twentieth aspect of the present invention, in the time-series data management program of the nineteenth aspect, when a time-series data generator produces data to be buffered, the time-series data generator provides the data, its generator number or identification number, and a value indicating the current time obtained by referring to a built-in clock as time information.

In accordance with the twenty-first aspect of the present invention, the time-series data management program of the nineteenth or twentieth aspect further comprises the steps of defining a buffer element indicated by a list end pointer as a buffer element to be written, referring to data write position information and checking the size of the available data storage area of the buffer element to determine whether or not the buffer element has sufficient free space for the data to be written, and when the buffer element has sufficient free space available for the data, writing the data to the buffer element.

In accordance with the twenty-second aspect of the present invention, the time-series data management program of one of the eighteenth to twenty-first aspects further comprises, to write the data to the buffer element, the steps of obtaining a current order value from the order counter, setting the order counter to a value obtained by adding 1 to the current order value, writing the data received from the time-series data generator, the time information and the current order value obtained by referring to the order counter to the data storage area indicated by data write position information, and updating the data write position information.

In accordance with the twenty-third aspect of the present invention, there is provided a time-series data management program for causing a computer to perform a time-series data management method in which a plurality of buffer elements are dynamically managed to be shared among a plurality of buffer users, the program comprising the steps of retaining the order of allocation of the respective buffer elements to the respective buffer users, receiving a buffer element allocation request from a first buffer user, when there is no unused buffer element, detecting a buffer element which was least recently allocated to a second buffer user based on the order of allocation, freeing the buffer element allocated to the second buffer user, and allocating the freed buffer element to the first buffer user.

As is described above, in accordance with the present invention, each time-series data generator is provided with individually the buffer element where data is to be written. Therefore, the time-series data generator need not perform exclusive access control concerning the use of the buffer with the other data generators to write data.

Further, the buffer is dynamically allocated to each time-series data generator. Thus, it is possible to avoid the problem of efficient use of the buffer caused by the allocation of the fixed-size buffer element to each time-series data generator.

Still further, data is written to the buffer element from the top of the data storage area. Accordingly, even when the latest time-series data is buffered at every moment, the start position (breakpoint) of the oldest or nearly oldest data can be specified.

BRIEF DESCRIPTION OF THE DRAWINGS

The exemplary aspects and features of the present invention will become more apparent from the consideration of the following detailed description taken in conjunction with the accompanying drawings in which.

DESCRIPTION OF THE PREFERRED EMBODIMENTS

Figure 1:
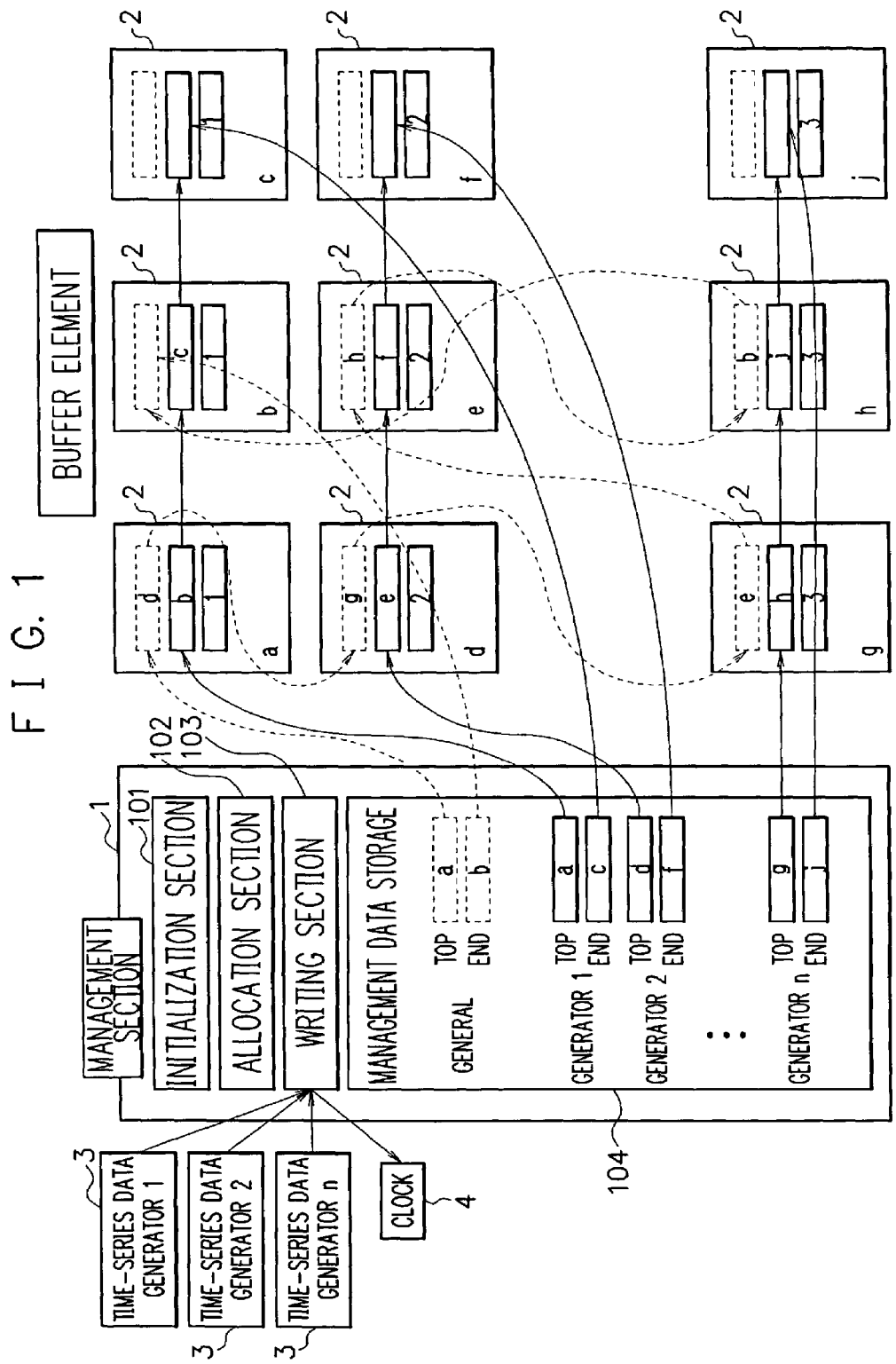
FIG. 1 is a diagram showing an example of the construction of a device or a system to which is applied a time-series data management method according to an embodiment of the present invention.

Referring now to the drawings, a description of preferred embodiments of the present invention will be given in detail.

A time-series data management method, a time-series data management device, a time-series data management system, and a time-series data management program of the present invention, in which a buffer for storing time-series data is divided into a plurality of segments (buffer elements), are characterized as follows:

1) The buffer is dynamically allocated to each data generator. More specifically, the buffer is allocated to each data generator based on the utilization of the buffer so far, as data write by the generator progresses.

2) When the buffer has no free space or area (all the buffer elements have been used), the buffer element storing the oldest data is reused. Thereby, the buffer as a whole can always store the latest data as with a ring buffer.

3) Data is written to the buffer element so that the beginning of the data is positioned at the top of the buffer element. Thereby, even when the lengths of respective data are not fixed or uniform, the start position of data can be specified easily. The beginning of data indicates the start position of data written to the buffer by a single writing operation. That is, data is written to the buffer element so that the top of the buffer element is aligned on the boundary between respective data.

4) Each data is written to the buffer for storing time-series data with a value indicating the order of time when the data has been written by a data generator.

To implement the characteristics of the present invention as above, there is provided a management section including an initialization section, an allocation section, a writing section, and a management data storage. In addition, each buffer element includes two types of list pointers. A plurality of the buffer elements are managed by two types of lists (a general list and generator lists) in the management data storage with the respective pointers.

The initialization section initializes the general list and the generator lists as a preparation for storing data from time-series data generators.

The allocation section extracts a buffer element at the top of the general list therefrom, and adds it to the bottom of the generator list for a data generator which has requested buffer allocation.

The writing section writes data produced by the data generator to the buffer element. On this occasion, if the buffer element does not have sufficient space for the data, the writing section requests the allocation section to allocate a new buffer element to write the data to the new one obtained by the request.

In accordance with the present invention, a buffer for storing time-series data is divided into a plurality of buffer elements to store and manage data efficiently even when there exists a plurality of time-series data generators. The buffer is managed with the use of two types of lists: an general list and generator lists. The general list indicate the buffer elements in order of creation time of data stored therein (in order of time when the respective buffer elements were used up or depleted). The generator list is provided for each data generator.

First Embodiment

FIG. 1 is a diagram showing an example of the construction of a device or a system to which is applied a time-series data management method according to the first embodiment of the present invention. As can be seen in FIG. 1, the time-series data management device or system comprises a management section 1, a plurality of buffer elements 2 (2-*a* to 2-*h* and 2-*j*), a plurality of time-series data generators 3 (3-1 to 3-*n*), and a clock 4. The management section 1 includes an initialization section 101, an allocation section 102, a writing section 103, and a management data storage 104.

Figure 2:
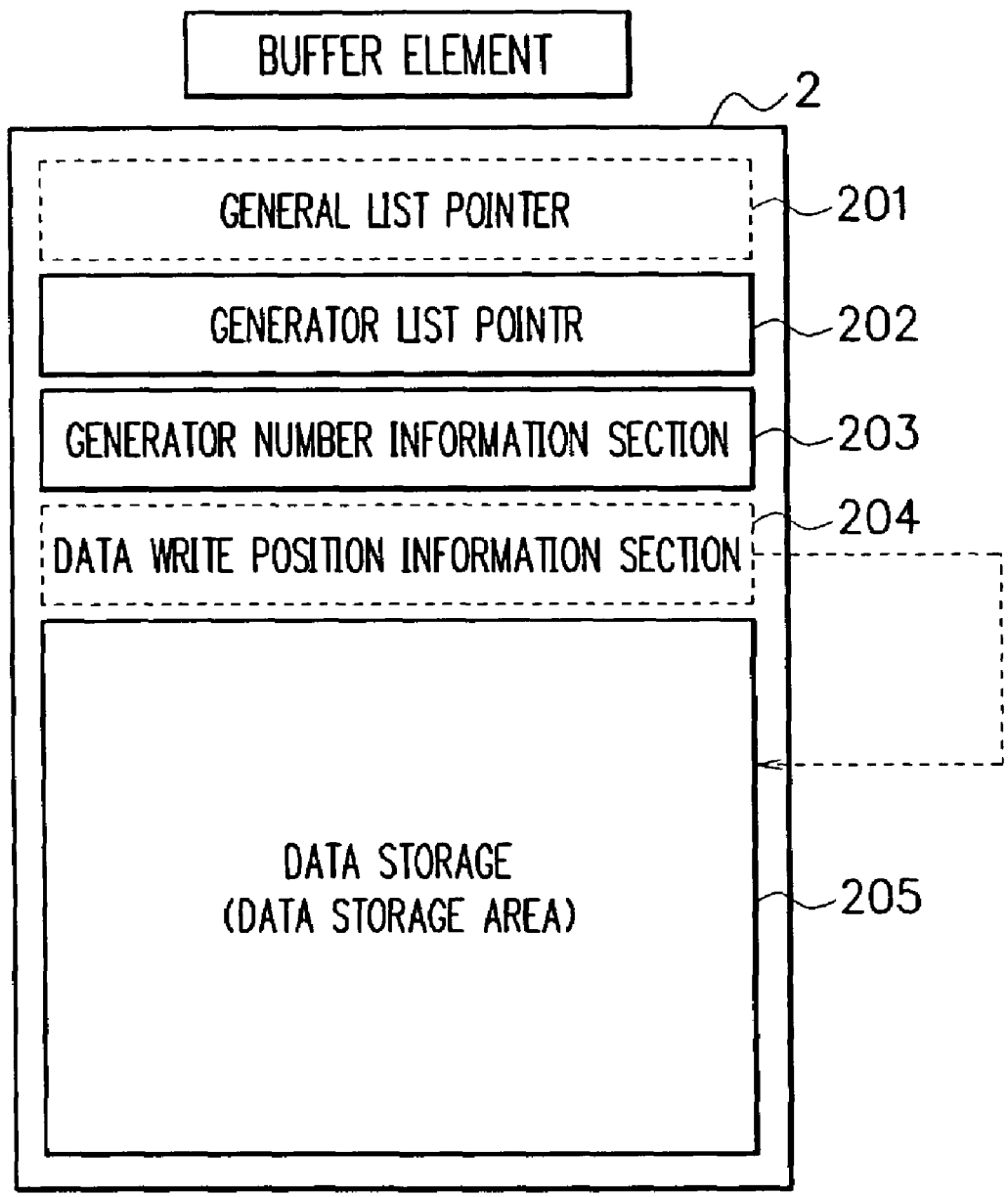
FIG. 2 is a diagram showing an example of the construction of a buffer element.

FIG. 2 is a diagram showing an example of the construction of the buffer element 2. As shown in FIG. 2, each of the buffer elements 2 (2-*a* to 2-*h* and 2-*j*) includes an general list pointer 201, a generator list pointer 202, a generator number information section 203, a data write position information section 204, and a data storage (data storage area) 205.

The general list pointer 201 is a pointer used for an general list. The generator list pointer 202 is a pointer used for a generator list. The generator number information section 203 manages information on the identification number of each data generator. The data write position information section 204 retains and manages information on location where data is to be written. The data storage 205 stores data including the general list, the generator list and the like individually in respective areas.

Incidentally, in this embodiment, the general list and the generator lists each consist of the list pointers to manage the order of the buffer elements. However, there is no special limitation on the method of managing the order of the buffer elements, and other methods capable of managing the buffer element order are within the scope of the present invention.

Further, in the description of this embodiment, there exists the time-series data generators 3-1 to 3-*n* (n: an integer not less than 2). There may be any number (more than one) of time-series data generators 3.

Figure 3:
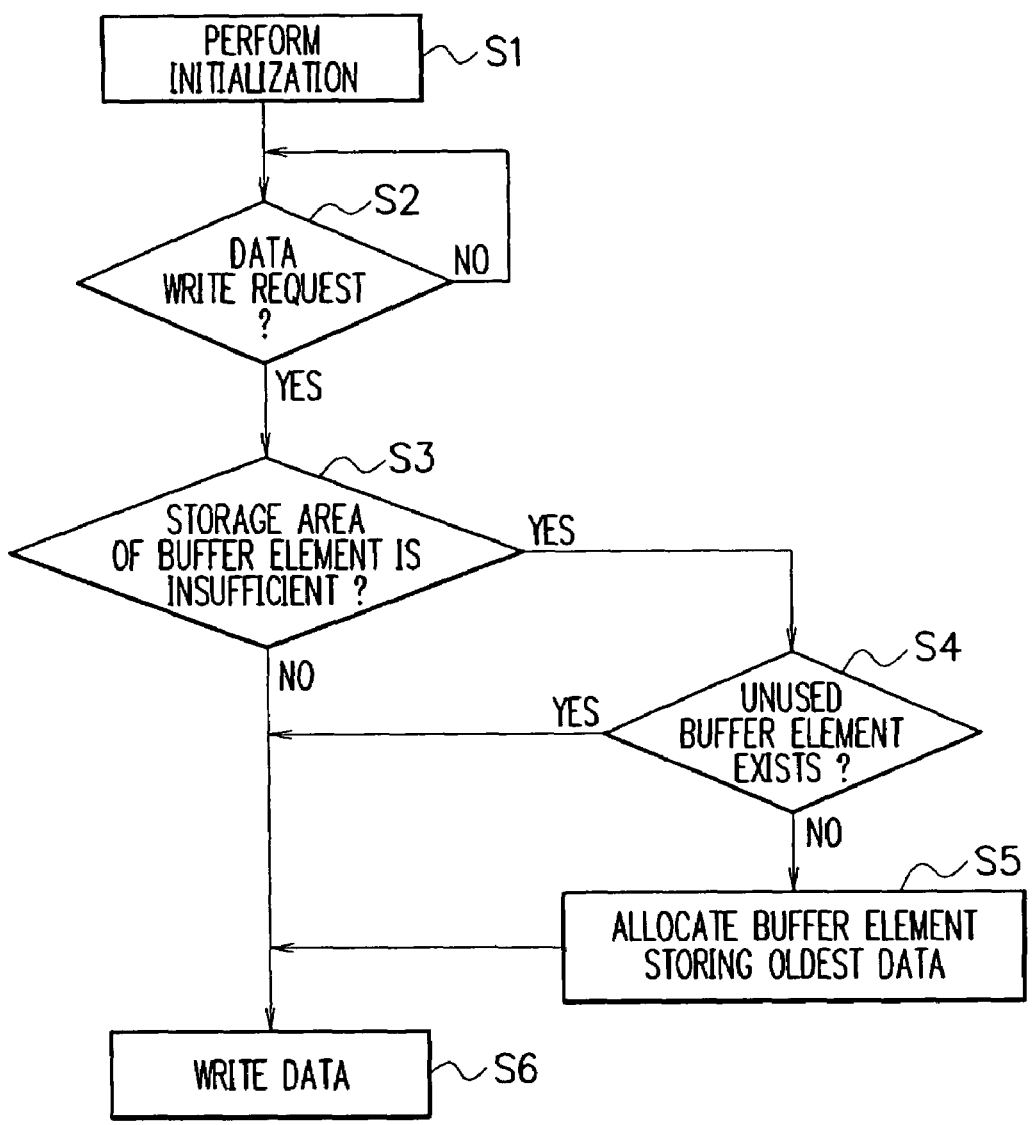
FIG. 3 is a flowchart schematically showing an example of the operation of a management section depicted in FIG. 1.

FIG. 3 is a flowchart schematically showing an example of the operation of the management section 1. Referring to FIG. 3, a description will be given of the operation of respective sections (101 to 104) in the management section 1.

The initialization section 101 performs initialization as a preparatory operation to store data from the time-series data generators 3 (3-1 to 3-*n*) in the buffer (step S1).

Having received a data write request from the time-series data generator 3 (step S2), the writing section 103 writes the data to a buffer element 2. In the case where the buffer element 2 does not have sufficient data storage area or space available for the data (step S3, Yes), the allocation section 102 allocates a new buffer element 2 for the data so that the data can be written thereto.

On receipt of a buffer element allocation request from the writing section 103, the allocation section 102 checks whether or not there is an unused buffer element 2. If there exists such a buffer element 2 (step S4, Yes), the allocation section 102 allocates the unused buffer element 2 for the data. When there is no unused buffer element 2 (step S4, No), a buffer element 2 which stores the oldest data (data produced least recently) is allocated for the data (step S5).

Incidentally, the time-series data generator 3 may be a processor such as a CPU (Central Processing Unit) or an MPU (Micro Processing Unit). The buffer elements 2 may be respective areas in a storage. Also, the buffer elements 2 may consist of the same storage medium, or each of them may consist of an individual storage medium. In the case where the time-series data generator 3 is a processor such as a CPU or an MPU, the processor may perform the operation of the management section 1 (e.g., change of pointers). In this embodiment, a computer may implement the management section 1, the buffer elements 2 and the time-series data generators 3, which are preferably connected via buses.

Besides, in this embodiment, a computer (client) may serve as the time-series data generator 3, and another computer (server having a CPU or an MPU) may serve as the management section 1. The buffer element 2 may be a storage, inside or independent of the management section 1, controlled by the management section 1. In the case where the management section 1 includes the buffer elements 2, the buffer elements 2 are volatile and/or permanent (nonvolatile) storage media, and the management section 1 is a computer on the server side having a communication means.

Further, the time-series data generator 3 may be a terminal such as a PC (Personal Computer), a mobile phone and a PDA (Personal Digital Assistant). The terminal may be connected to the management section 1 via a wired or wireless connection. The Internet, WAN (Wide Area Network) or LAN (Local Area Network) may also be used to connect the terminal with the management section 1. In addition, the management section 1 may be connected via the Internet, etc. to the buffer elements 2. In such a case, the buffer element 2 may exist on the Internet as a database. Or, a slave computer of the management section 1 may include the buffer elements 2.

In the following, a description will be given of the operation of the device or the system to which is applied the time-series data management method according to the first embodiment. As is described above, the time-series data management device or system comprises the management section 1, a plurality of the buffer elements 2 (2-*a* to 2-*h* and 2-*j*), a plurality of the time-series data generators 3 (3-1 to 3-*n*), and the clock 4.

The management section 1 dynamically allocates a buffer element to data produced by each time-series data generator 3. When the buffer has no free space or all the buffer elements 2 have been used, the management section 1 reuses one of the buffer elements 2 storing the oldest data. Thus, the buffer as a whole can always store the latest data. Besides, the management section 1 has a function to write data to the buffer element 2 so that the beginning of the data is positioned at the top of the buffer element 2.

The buffer element 2 is an element for storing data produced by the time-series data generators 3 under the control of the management section 1.

The time-series data generator 3 is, for example, an input device, a CPU or an MPU for producing data in a time series.

The initialization section 101 performs initialization as a preparatory operation to store data from the time-series data generators 3 in the buffer. More specifically, the initialization section 101 adds the buffer elements 2 (in this example, 2-*a*, 2-*d* and 2-*g*) to the generator lists corresponding to the time-series data generators 3-1 to 3-*n*, respectively, as well as adding the other buffer elements 2 to the general list.

Incidentally, "add" operation as used herein means "to store the address of the buffer element 2 in a pointer area prepared for constructing the list structure". That is, to "add" the buffer elements 2 to the generator lists corresponding to the time-series data generators 3-1 to 3-*n*, the initialization section 101 stores the addresses of the buffer elements 2-*a*, 2-*d* and 2-*g* in pointer variables (two pointer variables) in the management data storage 104. In this example, the address of the buffer elements 2-*a* is stored in the pointer variables "generator 1 top" and "generator 1 end". Similarly, the addresses of the buffer elements 2-*d* and 2-*g* are stored in the pointer variables "generator 2 top" and "generator 2 end", and "generator n top" and "generator n end", respectively, On the other hand, to "add" the other buffer elements 2 to the general list, the initialization section 101 operates as follows:

1. Store the address of the buffer element 2-*b* in the pointer "general top" in the management data storage 104
2. Store the address of the buffer element 2-*c* in the general list pointer 201 in the buffer element 2-*b*
3. Store the address of the buffer element 2-*e* in the general list pointer 201 in the buffer element 2-*c*
4. Store the address of the buffer element 2-*f* in the general list pointer 201 in the buffer element 2-*e*
5. Store the address of the buffer element 2-*h* in the general list pointer 201 in the buffer element 2-*f*
6. Store the address of the buffer element 2-*j* in the general list pointer 201 in the buffer element 2-*h* and the pointer "general end" in the management data storage 104

When the buffer elements 2 have been added to the lists (as a result of the aforementioned "add" operation), an appropriate order or relation is set for the buffer elements 2 by the pointers in the management data storage 104 and the list pointers of the respective buffer elements 2, and thereby the buffer elements 2 are ordered. Additionally, "top" in "general top", "generator 1 top", etc. means the top of the general list and the respective generator lists.

Figure 4:
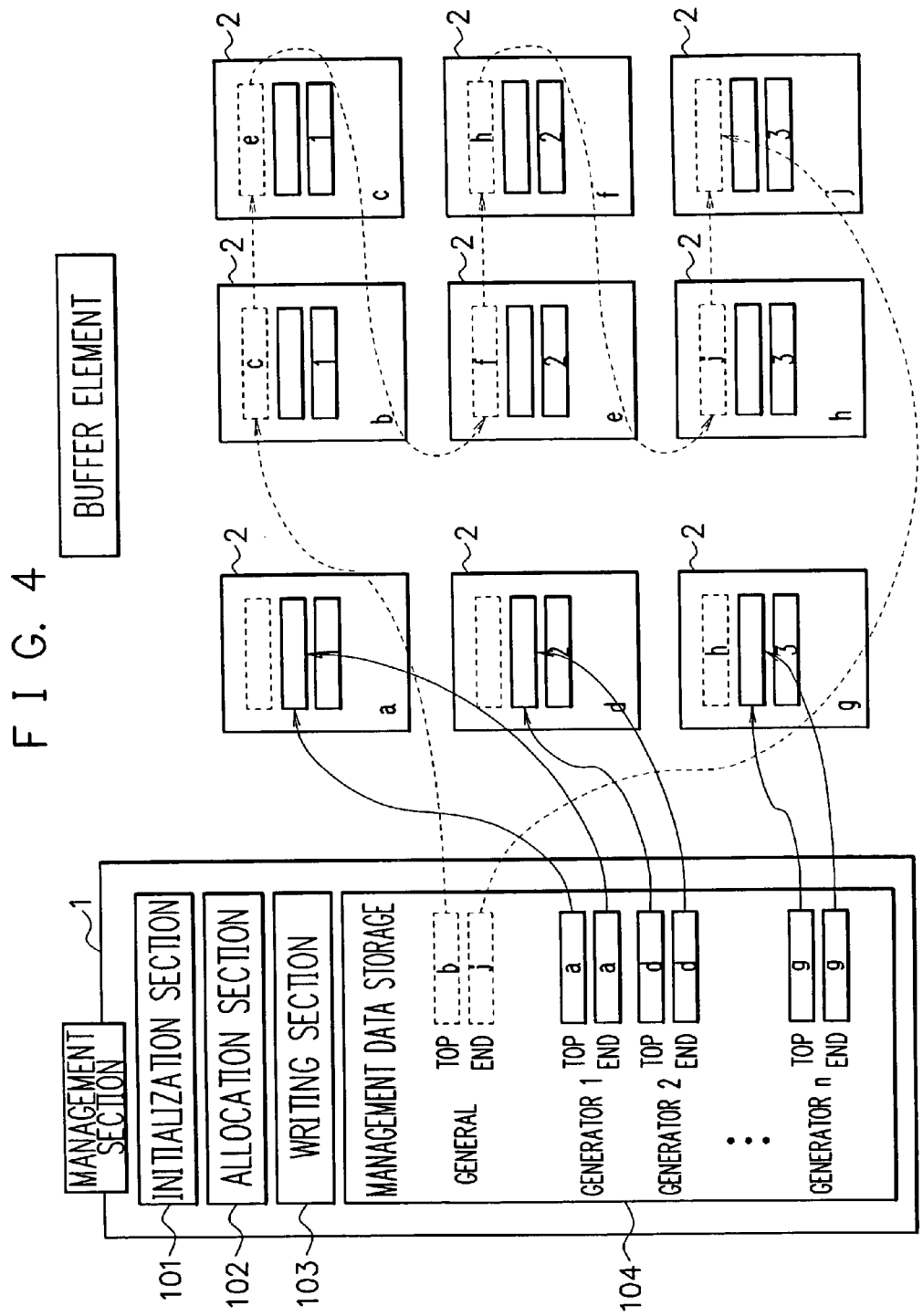
FIG. 4 is a diagram for explaining an example of the state resulting from initialization.

FIG. 4 is a diagram showing the state resulting from the initialization. As can be seen in FIG. 4, the state after the initialization is as follows:

1) The buffer elements 2-*b*, 2-*c*, 2-*e*, 2-*f*, 2-*h* and 2-*j* are listed or arranged in the general list
2) The buffer elements 2-*a*, 2-*d* and 2-*g* are listed in the generator lists corresponding to the time-series data generators 3-1 to 3-*n*, respectively.

Next, the operation of the writing section 103 will be described. In the following description, it is assumed that the respective lists that manage the buffer elements 2 are as shown in FIG. 1 at the beginning.

First, having produced data to be written to the buffer, the time-series data generator 3 activates the writing section 103. After activating the writing section 103, the time-series data generator 3 sends the writing section 103 the data to be written (the contents and the size) and its own generator number (in this example, generator number "n" of the time-series data generator 3-*n*).

The writing section 103 determines the buffer element 2 (2-*j*) indicated by the generator list end pointer as the one to be written. Referring to the data write position information section 204, the writing section 103 checks the size of available data storage area to determine whether or not there is enough free space for the data to be written.

When having determined that the data can be written to the buffer element 2-*j*, the writing section 103 operates to write the data thereto as follows:

1) Write the data received from the time-series data generator 3-*n* and a value indicating the current time obtained by referring to the clock 4 as time information to the data storage area designated by the data write position information
2) Update the data write position information, i.e., add a value indicating the size of the area in the data storage 205 occupied by the data and the time information written thereto to the value retained in the data write position information section 204 of the buffer element 2 (2-*j*)

On the other hand, in the case where the writing section 103 has determined that the data cannot be written to the buffer element 2-*j* (the buffer element 2-*j* does not have sufficient free space), the writing section 103 sends the allocation section 102 the generator number "n" of the time-series data generator 3-*n* which the section 103 is dealing with to request the allocation of a buffer element. After a new buffer element is allocated in response to the request, the writing section 103 performs the above processes 1) and 2), thereby writing the data to the new one.

Having received the buffer element allocation request from the writing section 103, the allocation section 102 first removes the buffer element 2 (2-a) indicated by the general list top pointer in the management data storage 104.

The allocation section 102 operates to remove the buffer element 2 (2-a) as follows:

1) Copy the contents of the general list pointer 201 of the buffer element 2-a (i.e., "d" corresponding to "general top a" in the management data storage 104) to the general list top pointer 2) Copy the contents of the generator list pointer 202 of the buffer element 2-a (i.e., "b") to the generator list top pointer in the management data storage 104 corresponding to the generator number (i.e., "1") stored in the generator number information section 203 of the buffer element 2-a to be removed Thus, the management data has been altered.

Subsequently, to add the removed buffer element 2-a to the bottom of a list corresponding to the generator number (in this example, generator number "n" of the time-series data generator 3-n) received from the writing section 103, the allocation section 102 updates the general list and initializes the buffer element 2-a. By adding the buffer element 2-a to the bottom of a list corresponding to the time-series data generator 3-n, the generator list of the data generator 3-n is altered. In this case, the condition where three buffer elements 2-g, 2-h and 2-j are listed or arranged in this order as shown in FIG. 1 (before the addition of the buffer element 2-a) is changed so that four buffer elements 2-g, 2-h, 2-j and 2-a are listed in this order (after the addition of the buffer element 2-a).

Incidentally, the buffer element 2 (2-j) indicated by the generator list end pointer in the management data storage 104 corresponding to the generator number (generator number "n" of the time-series data generator 3-n) from the writing section 103 will be hereinafter referred to as an operation object element (operation object buffer element).

The allocation section 102 updates the general list by adding the operation object element (buffer element 2-j) to the bottom of the general list. More specifically, the allocation section 102 copies a value indicating the operation object element (buffer element 2-j) to the general list pointer 201 of the buffer element 2 (2-b) indicated by the general list end pointer and the general list end pointer in the management data storage 104 ("general end b" in the management data storage 104 shown in FIG. 1).

In order to add the removed buffer element to a generator list, the allocation section 102 copies a value indicating the removed buffer element 2 (2-a) to the generator list pointer 202 of the operation object element (buffer element 2-j) and the generator list end pointer corresponding to the generator number of the time-series data generator 3 (3-n) received from the writing section 103 in the management data storage 104 ("generator n end j" in the management data storage 104 shown in FIG. 1).

The allocation section 102 operates to initialize the buffer element 2 (2-a) as follows:

1) Set a value indicating the top of the data storage area of the removed buffer element 2 (2-a) in the data write position information section 204 of the buffer element 2 (2-a)

2) Write the generator number (in this example, generator number "n" of the time-series data generator 3-n) received from the writing section 103 to the generator number information section 203 of the removed buffer element 2 (2-a)

Figure 5:
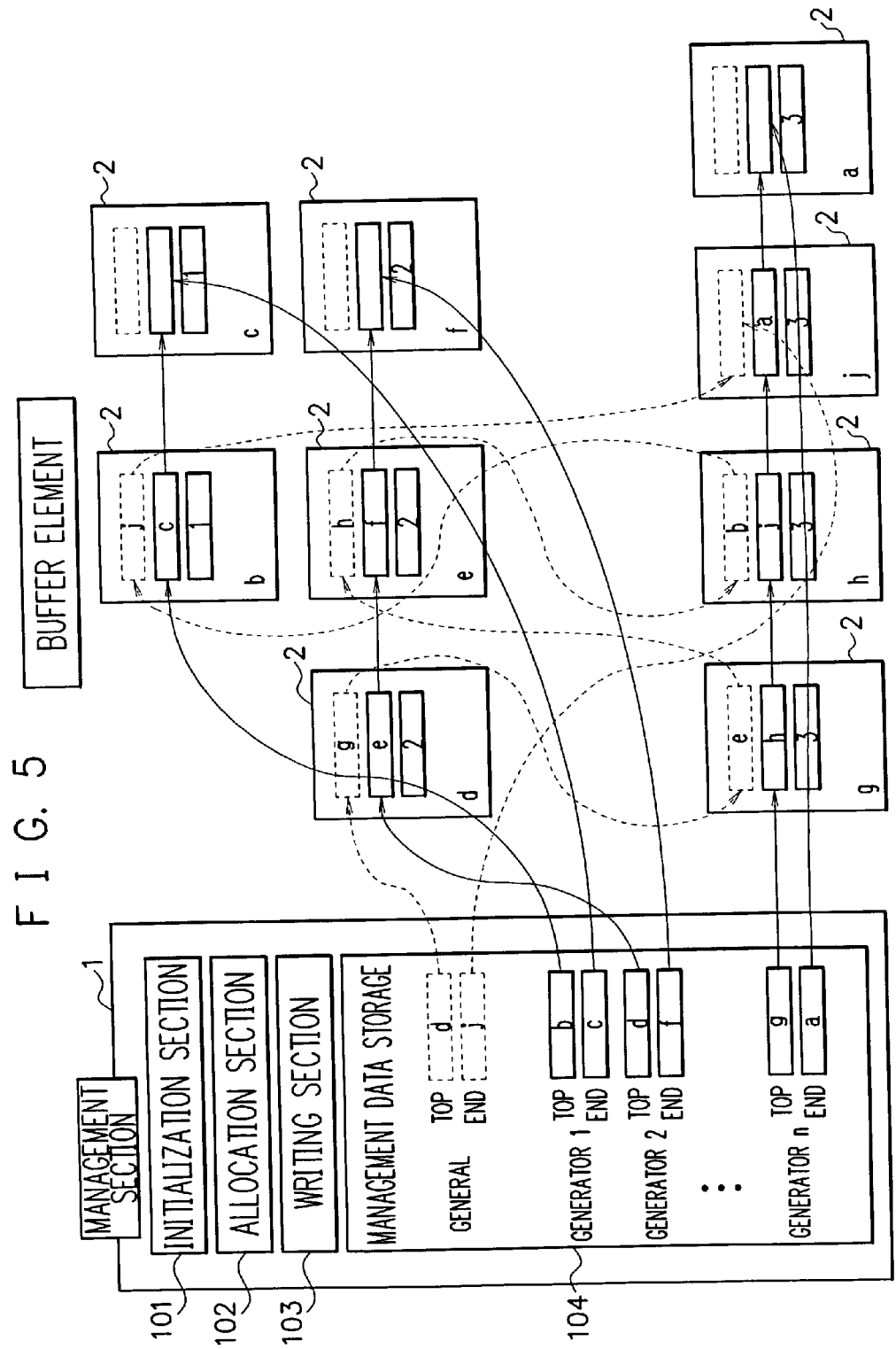
FIG. 5 is a diagram for explaining an example of the state (buffer element-added state) resulting from initialization.

FIG. 5 is a diagram showing the result of the buffer allocation performed with respect to the state shown in FIG. 1.

On completion of the buffer allocation by the allocation section 102, the data write position information section 204 of the buffer element 2 indicates the top of the data storage area. This means that the whole data storage area is available. Thereby, the writing section 103 can write the data to the buffer element 2.

The writing section 103 writes the data to the allocated buffer element 2.

As a result of the above operation, in the general list, all the buffer elements except for the one currently used for data write are arranged in order of time when the respective buffer elements were used up or depleted. Meanwhile, in the generator list corresponding to each of the time-series data generators, the buffer elements are arranged in order of time when the time-series data generator wrote data to the respective buffer elements.

Besides, the time information indicating the time when data is written to the buffer is attached to each data stored in the buffer. Thus, it is possible to read out data produced by the respective time-series data generators in order of the time.

Incidentally, in this embodiment, the buffer element is requested, allocated, used, and/or removed with respect to one time-series data generator for the purpose of the explanations. In practical application, the buffer elements may be requested, allocated, used, and/or removed for a plurality of data generators by different steps or processes. The embodiment can be changed or modified to be applied to such a case.

As is described above, in accordance with the first embodiment of the present invention, the buffer is dynamically allocated to each time-series data generator. More specifically, the buffer is allocated to each time-series data generator based on the utilization of the buffer so far, as data write by the data generator progresses.

In addition, each time-series data generator is provided with individually the buffer element where data is to be written. Therefore, the time-series data generator need not perform exclusive access control concerning the use of the buffer with the other data generators to write data.

Further, the buffer is dynamically allocated to each time-series data generator in such a manner that the buffer elements are allocated in order of time when the respective buffer elements were used up or depleted. Thus, it is possible to avoid the problem of the efficient use of the buffer caused by the allocation of the fixed-size buffer to each time-series data generator. In other words, the time length of time-series data which can be stored in the buffer is not reduced.

Still further, data is written to the buffer element from the top of the data storage area. Accordingly, even when the latest time-series data is buffered at every moment, the start position (breakpoint) of the oldest or nearly oldest data can be specified.

Second Embodiment

Figure 6:
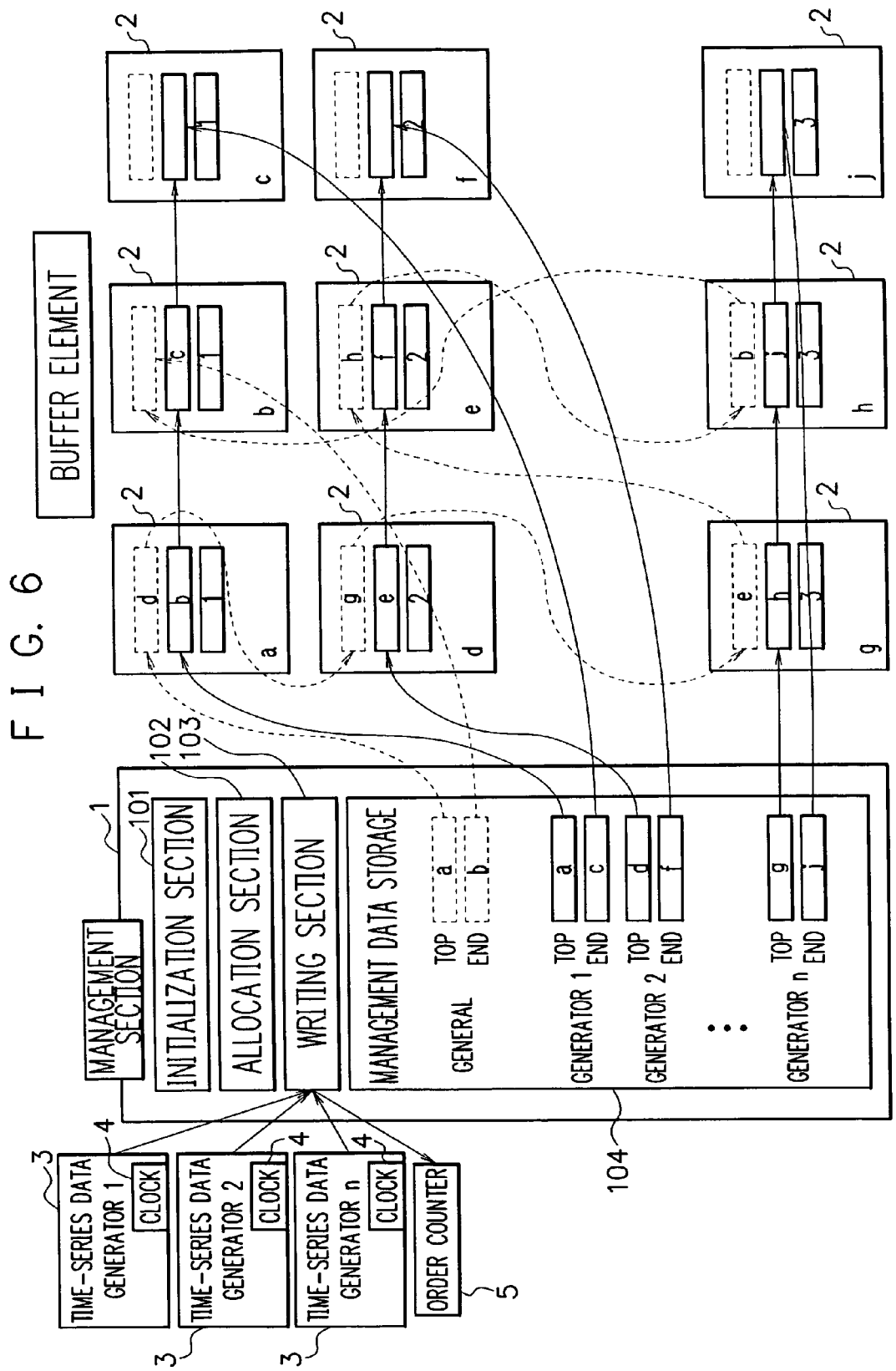
FIG. 6 is a diagram showing an example of the construction of a device or a system to which is applied a time-series data management method according to another embodiment of the present invention.

FIG. 6 is a diagram showing an example of the construction of a device or a system to which is applied a time-series data management method according to the second embodiment of the present invention. As can be seen in FIG. 6, the time-series data management device or system comprises a management section 1, a plurality of buffer elements 2 (2-a to 2-h and 2-j), a plurality of time-series data generators 3 (3-1 to 3-n) each including a clock 4, and an order counter 5. That is, the time-series data management device or system of the second embodiment is in many respects basically similar to that of the first embodiment except for the presence of the order counter 5 and that each time-series data generator 3 includes the built-in clock 4. The management section 1 of the second embodiment includes, as with that of the first embodiment, an initialization section 101, an allocation section 102, a writing section 103, and a management data storage 104. Each of the buffer elements 2 is of the same construction and operates in substantially the same manner as that of the first embodiment described in detail hereinbefore.

In the following, a description will be given of the operation of the device or the system to which is applied the time-series data management method according to the second embodiment. The same description as previously given in the first embodiment will not be repeated.

In addition to performing initialization (in the first embodiment, step S1 of FIG. 3), the initialization section 101 also resets the order counter 5 by setting the counter 5 to a predetermined default value.

Having produced data to be written to the buffer, the time-series data generator 3 activates the writing section 103. After activating the writing section 103, the time-series data generator 3 sends the writing section 103 a value indicating the current time obtained by referring to the clock 4 therein in addition to the information described previously in the first embodiment.

The writing section 103 determines a buffer element indicated by the generator list end pointer as the one to be written. Referring to the data write position information section 204 of the buffer element, the writing section 103 checks the size of available data storage area to determine whether or not there is enough free space for the data to be written.

When having determined that the data can be written to the buffer element, the writing section 103 operates to write the data thereto as follows:

1) Obtain a current order value from the order counter 5, and set the order counter 5 to a value obtained by adding 1 to the current order value 2) Write the data received from the time-series data generator, a value indicating the current time (time information) and the current order value obtained by referring to the order counter 5 to the data storage area indicated by the data write position information 3) Update the data write position information, i.e., shift (update) the data write position by the size of the area occupied by the data, the time information and the current order value In the case where the writing section 103 has determined that the data cannot be written to the buffer element (the buffer element does not have sufficient free space), the writing section 103 operates in the same manner as that of the first embodiment.

As is described above, in accordance with the second embodiment of the present invention, information indicating the order in which data was written to the buffer is attached to each data stored in the buffer. Thus, if the data read-out is performed based on the information, data produced by all the time-series data generators can be read out in the same order in which the data were written to the buffer.

As set forth hereinabove, in accordance with the present invention, a buffer for storing time-series data can be managed to store the latest one of data produced by time-series data generators. The present invention can be advantageously applied to the management of a buffer for storing time-series data especially in cases as follows:

1) There exist a plurality of time-series data generators
2) Data produced by respective time-series data generators need to be read out in order of data creation time
3) The length of each data is not fixed (variable)

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

What is claimed is:

1. A time-series data management method in which a buffer for storing time-series data from a plurality of time-series data generators is divided into a plurality of buffer elements, the method comprising the steps of:

dynamically allocating buffer element to each time-series data generator;

checking whether or not the buffer element has free space;

when the buffer element has no free space, reusing a buffer element storing the oldest data for allocation;

writing data received from a time-series data generator and a value indicating the current time obtained by referring to a clock as time information to the data storage area of the buffer element indicated by a data write position information; and adding a value indicating the size of the data storage area occupied by the data and the time information written thereto to the value retained as the data write position information.

2. A time-series data management method comprising the steps of:

performing initialization as a preparation for buffering data from time-series data generators by adding buffer elements to generator lists corresponding to the time-series data generators, respectively, and adding other buffer elements to a general list;

receiving a data write request from a time-series data generator;

checking whether or not a buffer element to be written has sufficient data storage area before the data is written to the buffer element;

when the buffer element does not have sufficient data storage area, checking whether or not there is an unused buffer element; and when there is no unused buffer element, reusing a buffer element storing the oldest data allocation, wherein the step of initialization includes the step of setting an order counter to a predetermined default value, and wherein when a time-series data generator produces data to be buffered, the time-series data generator provides the data, its generator number, and a value indicating the current time obtained by referring to a built-in clock as time information.

3. A time-series data management method comprising the steps of:

performing initialization as a preparation for buffering data from time-series data generators by adding buffer elements to generator lists corresponding to the time-series data generators, respectively, and adding other buffer elements to a general list;

receiving a data write request from a time-series data generator;

checking whether or not a buffer element to be written has sufficient data storage area before the data is written to the buffer element;

when the buffer element does not have sufficient data storage area, checking whether or not there is an unused buffer element;

when there is no unused buffer element, reusing a buffer element storing the oldest data allocation;

defining a buffer element indicated by a list end pointer as a buffer element to be written;

referring to data write position information and checking the size of the available data storage area of the buffer element to determine whether or not the buffer element has sufficient free space for the data to be written; and when the buffer element has sufficient free space available for the data, writing the data to the buffer element, wherein the step of initialization includes the step of setting an order counter to a predetermined default value.

4. A time-series data management method comprising the steps of:

performing initialization as a preparation for buffering data from time-series data generators by adding buffer elements to generator lists corresponding to the time-series data generators, respectively, and adding other buffer elements to a general list;

receiving a data write request from a time-series data generator;

checking whether or not a buffer element to be written has sufficient data storage area before the data is written to the buffer element;

when the buffer element does not have sufficient data storage area, checking whether or not there is an unused buffer element;

when there is no unused buffer element, reusing a buffer element storing the oldest data allocation;

further comprising, to write the data to the buffer element, the steps of:

obtaining a current order value from the order counter;

setting the order counter to a value obtained by adding 1 to the current order value;

writing the data received from the time-series data generator, a value indicating the current time as time information and the current order value obtained by referring to the order counter to the data storage area indicated by data write position information; and updating the data write position information, wherein the step of initialization includes the step of setting an order counter to a predetermined default value.

5. A time-series data management method in which a plurality of buffer elements are dynamically managed to be shared among a plurality of buffer users, the method comprising the steps of:

retaining the order of allocation of the respective buffer elements to the respective buffer users;

receiving a buffer element allocation request from a first buffer user;

when there is no unused buffer element, detecting a buffer element which was least recently allocated to a second buffer user based on the order of allocation;

freeing the buffer element allocated to the second buffer user; and allocating the freed buffer element to the first buffer user.

6. A time-series data management device comprising:

a management section, a plurality of buffer elements, a plurality of time-series data generators, a clock, is built in each of the time-series data generator;

wherein the management section dynamically allocates a buffer element to data produced by each time-series data generator;

when the buffer element has no free space, the management section reuses a buffer element storing the oldest data so that the buffer as a whole always stores the latest data;

the management section writes data to the buffer element so that the beginning of the data is positioned at the top of the buffer element;

the buffer elements store data produced by the time-series data generators according to instructions from the management section;

the time-series data generators produce data in a time series; and an order counter that is set to a predetermined default value.

7. A time-series data management system comprising a management section, a plurality of buffer elements, a plurality of time-series data generators, and a clock, wherein:

the management section is a computer;

the time-series data generator is another computer;

the buffer element is a storage, inside or independent of the management section, controlled by the management section;

the management section dynamically allocates a buffer element to data produced by each time-series data generator;

when the buffer element has no free space, the management section reuses a buffer element storing the oldest data so that the buffer as a whole always stores the latest data;

the management section writes data to the buffer element so that the beginning of the data is positioned at the top of the buffer element;

the buffer elements store data produced by the time-series data generators according to instructions from the management section;

the time-series data generators produce data in a time series;

further comprising an order counter, wherein:

the clock is built in each of the time-series data generator; and the order counter is set to a predetermined default value.

8. A time-series data management program for causing a computer to perform a time-series data management method in which a buffer to store time-series data from a plurality of time-series data generators is divided into a plurality of buffer elements, the method comprising the steps of:

dynamically allocating a buffer element to each time-series data generator;

adding buffer elements to generator lists corresponding to the time-series data generators, respectively;

adding other buffer elements to a general list; and checking whether or not the buffer element has free space;

when the buffer element has no free space, reusing a buffer element storing the oldest data for allocation;

wherein the step of buffer element allocation includes the steps of:

writing data received from a time-series data generator and a value indicating the current time obtained by referring to a clock as time information to the data storage area of the buffer element indicated by data write position information; and adding a value indicating the size of the data storage area occupied by the data and the time information written thereto to the value retained as the data write position information.

9. A time-series data management program for causing a computer to perform a time-series data management method, comprising the steps of:

performing initialization as a preparation for buffering data from time-series data generators by adding buffer elements to generator lists corresponding to the time-series data generators, respectively, and adding other buffer elements to a general list;

receiving a data write request from a time-series data generator;

checking whether or not a buffer element to be written has sufficient data storage area before the data is written to the buffer element;

when the buffer element does not have sufficient data storage area, checking whether or not there is an unused buffer element; and when there is no unused buffer element, reusing a buffer element storing the oldest data for allocation;

wherein the step of initialization includes the step of setting an order counter to a predetermined default value;

wherein when a time-series data generator produces data to be buffered, the time-series data generator provides the data, its generator number, and a value indicating the current time obtained by referring to a built-in clock as time information.

10. A time-series data management program for causing a computer to perform a time-series data management method, comprising the steps of:

performing initialization as a preparation for buffering data from time-series data generators by adding buffer elements to generator lists corresponding to the time-series data generators, respectively, and adding other buffer elements to a general list;

receiving a data write request from a time-series data generator;

checking whether or not a buffer element to be written has sufficient data storage area before the data is written to the buffer element;

when the buffer element does not have sufficient data storage area, checking whether or not there is an unused buffer element; and when there is no unused buffer element, reusing a buffer element storing the oldest data for allocation;

wherein the step of initialization includes the step of setting an order counter to a predetermined default value;

further comprising the steps of:

defining a buffer element indicated by a list end pointer as a buffer element to be written;

referring to data write position information and checking the size of the available data storage area of the buffer element to determine whether or not the buffer element has sufficient free space for the data to be written; and when the buffer element has sufficient free space available for the data, writing the data to the buffer element.

11. A time-series data management program for causing a computer to perform a time-series data management method, comprising the steps of:

performing initialization as a preparation for buffering data from time-series data generators by adding buffer elements to generator lists corresponding to the time-series data generators, respectively, and adding other buffer elements to a general list;

receiving a data write request from a time-series data generator;

checking whether or not a buffer element to be written has sufficient data storage area before the data is written to the buffer element;

when the buffer element does not have sufficient data storage area, checking whether or not there is an unused buffer element; and when there is no unused buffer element, reusing a buffer element storing the oldest data for allocation;

wherein the step of initialization includes the step of setting an order counter to a predetermined default value;

further comprising, to write the data to the buffer element, the steps of:

obtaining a current order value from the order counter;

setting the order counter to a value obtained by adding 1 to the current order value;

writing the data received from the time-series data generator, a value indicating the current time as time information and the current order value obtained by referring to the order counter to the data storage area indicated by data write position information; and updating the data write position information.

12. A time-series data management program for causing a computer to perform a time-series data management method in which a plurality of buffer elements are dynamically managed to be shared among a plurality of buffer users, the program comprising the steps of:

retaining the order of allocation of the respective buffer elements to the respective buffer users;

receiving a buffer element allocation request from a first buffer user;

when there is no unused buffer element, detecting a buffer element which was least recently allocated to a second buffer user based on the order of allocation;

freeing the buffer element allocated to the second buffer user; and allocating the freed buffer element to the first buffer user.

* * * * *

UNITED STATES PATENT AND TRADEMARK OFFICE
CERTIFICATE OF CORRECTION

PATENT NO. : 7,577,159 B2
APPLICATION NO. : 11/220639
DATED : August 18, 2009
INVENTOR(S) : Takashi Horikawa Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 885 days.

Signed and Sealed this

Seventh Day of September, 2010

David J. Kappos
*Director of the United States Patent and Trademark Office*